(12) United States Patent
Nakano et al.

(10) Patent No.: US 10,605,185 B2
(45) Date of Patent: Mar. 31, 2020

(54) VALVE CONTROL DEVICE AND VALVE CONTROL METHOD

(71) Applicant: HINO MOTORS, LTD., Hino-shi, Tokyo (JP)

(72) Inventors: Hitoshi Nakano, Hino (JP); Hidemasa Takayama, Hino (JP)

(73) Assignee: HINO MOTORS, LTD., Hino-Shi, Tokyo (JP)

(*) Notice: Subject to any disclaimer, the term of this patent is extended or adjusted under 35 U.S.C. 154(b) by 0 days.

(21) Appl. No.: 16/182,860

(22) Filed: Nov. 7, 2018

(65) Prior Publication Data

US 2019/0145328 A1 May 16, 2019

(30) Foreign Application Priority Data

Nov. 10, 2017 (JP) ................. 2017-217580

(51) Int. Cl.
*F02D 41/00* (2006.01)
*F02B 37/22* (2006.01)
(Continued)

(52) U.S. Cl.
CPC .......... *F02D 41/0077* (2013.01); *F02B 37/22* (2013.01); *F02D 41/005* (2013.01);
(Continued)

(58) Field of Classification Search
CPC ............ F02D 41/0077; F02D 41/1401; F02D 41/005; F02D 41/0052; F02D 41/0007; F02D 2041/0067; F02D 2200/0416; F02D 2200/0402; F02D 2041/1416; F02D 2200/602; F02D 2200/0414; F02D 2200/101; F02B 37/22; F02M 26/05; F02M 26/48
(Continued)

(56) References Cited

U.S. PATENT DOCUMENTS 6,338,245 B1 * 1/2002 Shimoda .................. F02B 1/12
60/278
7,021,051 B2 * 4/2006 Igarashi .................. F01N 3/023
60/274
(Continued)

FOREIGN PATENT DOCUMENTS

JP 2003-193875 A 7/2003

*Primary Examiner* — Hoang M Nguyen
(74) *Attorney, Agent, or Firm* — Kilpatrick Townsend & Stockton LLP

(57) ABSTRACT

A valve control device controls an opening degree of a valve provided in an intake passage, an exhaust passage, or a passage connected one of these and includes an observed value acquisition unit, an inlet temperature acquisition unit, a target calculation unit, an equilibrium opening degree calculation unit, an observer, a correction opening degree calculation unit, an instruction opening degree calculation unit, and an output unit. The target calculation unit calculates an equilibrium state value and a target property value. The correction opening degree calculation unit calculates a correction opening degree by multiplying a gain matrix by a deviation vector including, a deviation between the equilibrium state value and the estimated state value and an integrated value of a deviation between the target property value and the estimated property value.

6 Claims, 4 Drawing Sheets

(51) Int. Cl.
*F02M 26/05* (2016.01)
*F02M 26/48* (2016.01)
*F02D 41/14* (2006.01)

(52) U.S. Cl.
CPC ..... *F02D 41/0007* (2013.01); *F02D 41/0052* (2013.01); *F02D 41/1401* (2013.01); *F02M 26/05* (2016.02); *F02M 26/48* (2016.02); *F02D 2041/0067* (2013.01); *F02D 2041/1416* (2013.01); *F02D 2200/0402* (2013.01); *F02D 2200/0414* (2013.01); *F02D 2200/0416* (2013.01); *F02D 2200/101* (2013.01); *F02D 2200/602* (2013.01)

(58) Field of Classification Search
USPC .... 60/600, 602, 605.1, 605.2, 611; 123/360, 123/361, 376, 403
See application file for complete search history.

(56) References Cited

U.S. PATENT DOCUMENTS

| | | | | |
|---|---|---|---|---|
| 2005/0109028 | A1* | 5/2005 | Shirakawa | F01N 3/0814 60/602 |
| 2009/0288621 | A1* | 11/2009 | Mikawa | F01L 1/344 123/90.15 |
| 2018/0283327 | A1* | 10/2018 | Sasaki | F02M 26/64 |
| 2018/0363541 | A1* | 12/2018 | Sase | F02D 41/0007 |

* cited by examiner

VALVE CONTROL DEVICE AND VALVE CONTROL METHOD

CROSS REFERENCE TO RELATED APPLICATIONS

This application claims priority to Japanese Patent Application No. 2017-217580, filed Nov. 10, 2017, the disclosure of which is incorporated by reference herein in its entirety.

BACKGROUND

The present disclosure relates to a valve control device and a valve control method that control the opening degree of a valve provided in the intake passage of an engine, the exhaust passage of an engine, or a passage connected to one of the intake passage and the exhaust passage.

The engine draws in working gas in an intake stroke and supplies the drawn working gas with fuel, thereby generating air-fuel mixtures. Thus, the properties of the working gas drawn into the engine are remarkably important for controlling the output or exhaust gas of the engine. Japanese Laid-Open Patent Publication No. 2003-193875 describes an example of a device that is mounted in an engine system and controls the properties of such working gas. More specifically, the device includes an exhaust gas recirculation (EGR) device having an EGR passage, through which some exhaust gas flows back from the exhaust side toward the intake side, a turbocharger that turbocharges intake air using the energy of exhaust gas, and the like.

Each of the EGR device and the turbocharger includes a valve capable of varying the cross-sectional flow areas of passages through which various types of gases flow. That is, the EGR device includes an EGR valve capable of varying the cross-sectional flow area of an EGR passage, and the turbocharger includes a variable nozzle (variable valve) capable of varying the cross-sectional flow area of a passage through which exhaust gas flows into the turbine. The opening degrees of these valves may need to be controlled so that the properties of working gas drawn into the engine are highly precisely controlled to be desired properties. Such control may be needed not only for the valves including the EGR device and the turbocharger but also for a valve that is provided in the intake passage of the engine, the exhaust passage of the engine, or a passage connected to one of the intake passage and the exhaust passage and can adjust the cross-sectional flow area of the passage.

SUMMARY

The present disclosure relates to a valve control device and a valve control method that highly precisely control the properties of working gas drawn into the engine.

According to one aspect of the present disclosure, a valve control device controls an opening degree of at least one valve provided in at least one of an intake passage of an engine, an exhaust passage of the engine, and a passage connected to the intake passage or the exhaust passage. The valve control device includes an observed value acquisition unit configured to acquire an observed value of an engine rotation speed, an observed value of an accelerator operation amount, and an observed value of the opening degree of the at least one valve, an inlet temperature acquisition unit configured to acquire an inlet temperature, the inlet temperature being a temperature of gas flowing into the at least one valve, a target calculation unit configured to calculate an equilibrium state value that is a value of a state parameter when the engine is in a steady state based on the observed value of the engine rotation speed and the observed value of the accelerator operation amount, the state parameter including an upstream pressure and a downstream pressure of the at least one valve and a flow rate at the at least one valve, and calculate a target property value that is a value of a property parameter when the engine is in a target state corresponding to the observed value of the engine rotation speed and the observed value of the accelerator operation amount, and the property parameter is related to properties of working gas drawn into the engine, an equilibrium opening degree calculation unit configured to calculate an equilibrium opening degree that is an opening degree of the at least one valve in the steady state of the engine using a calculation expression that includes, as variables, an equilibrium state value of the upstream pressure, an equilibrium state value of the downstream pressure, an equilibrium state value of the flow rate, and an acquired value of the inlet temperature, an observer configured to calculate an estimated state value of the state parameter and an estimated property value of the property parameter using a model that includes, as a variable, an observed value of the opening degree of the at least one valve, a correction opening degree calculation unit configured to calculate a correction opening degree used to correct the equilibrium opening degree by multiplying a gain matrix by a deviation vector including, as components, a deviation between the equilibrium state value and the estimated state value and an integrated value of a deviation between the target property value and the estimated property value, an instruction opening degree calculation unit configured to calculate an instruction opening degree by correcting the equilibrium opening degree using the correction opening degree, the instruction opening degree being used to control the state parameter from the estimated state value toward the equilibrium state value while causing a value of the property parameter to follow the target property value, and an output unit configured to output a control signal indicating the instruction opening degree to the at least one valve.

According to one aspect of the present disclosure, a valve control method controls an opening degree of at least one valve provided in at least one of an intake passage of an engine, an exhaust passage of the engine, and a passage connected to the intake passage or the exhaust passage. The valve control method includes acquiring an observed value of an engine rotation speed, an observed value of an accelerator operation amount, and an observed value of the opening degree of the at least one valve, acquiring an inlet temperature, the inlet temperature being a temperature of gas flowing into the at least one valve, calculating an equilibrium state value that is a value of a state parameter when the engine is in a steady state based on the observed value of the engine rotation speed and the observed value of the accelerator operation amount, the state parameter including an upstream pressure and a downstream pressure of the at least one valve and a flow rate at the at least one valve, calculating a target property value that is a value of a property parameter when the engine is in a target state corresponding to the observed value of the engine rotation speed and the observed value of the accelerator operation amount, and the property parameter is related to properties of working gas drawn into the engine, calculating an equilibrium opening degree that is an opening degree of the at least one valve in the steady state of the engine using a calculation expression that includes, as variables, an equilibrium state value of the upstream pressure, an equilibrium state value of the downstream pressure, an equilibrium state value of the flow rate, and an acquired value of the inlet temperature, calculating an estimated state value of the state parameter and an estimated property value of the property parameter using a model that includes, as a variable, an observed value of the opening degree of the at least one valve, calculating a correction opening degree used to correct the equilibrium opening degree by multiplying a gain matrix by a deviation vector including, as components, a deviation between the equilibrium state value and the estimated state value and an integrated value of a deviation between the target property value and the estimated property value, calculating an instruction opening degree by correcting the equilibrium opening degree using the correction opening degree, the instruction opening degree being used to control the state parameter from the estimated state value toward the equilibrium state value while causing a value of the property parameter to follow the target property value, and outputting a control signal indicating the instruction opening degree to the at least one valve.

According to one aspect of the present disclosure, a valve control device that controls an opening degree of at least one valve provided in at least one of an intake passage of an engine, an exhaust passage of the engine, and a passage connected to the intake passage or the exhaust passage. The valve control device comprising circuitry configured to acquire an observed value of an engine rotation speed, an observed value of an accelerator operation amount, and an observed value of the opening degree of the at least one valve, acquire an inlet temperature, the inlet temperature being a temperature of gas flowing into the at least one valve, calculate an equilibrium state value that is a value of a state parameter when the engine is in a steady state based on the observed value of the engine rotation speed and the observed value of the accelerator operation amount, the state parameter including an upstream pressure and a downstream pressure of the at least one valve and a flow rate at the at least one valve, calculate a target property value that is a value of a property parameter when the engine is in a target state corresponding to the observed value of the engine rotation speed and the observed value of the accelerator operation amount, and the property parameter is related to properties of working gas drawn into the engine, calculate an equilibrium opening degree that is an opening degree of the at least one valve in the steady state of the engine using a calculation expression that includes, as variables, an equilibrium state value of the upstream pressure, an equilibrium state value of the downstream pressure, an equilibrium state value of the flow rate, and an acquired value of the inlet temperature, calculate an estimated state value of the state parameter and an estimated property value of the property parameter using a model that includes, as a variable, an observed value of the opening degree of the at least one valve, calculate a correction opening degree used to correct the equilibrium opening degree by multiplying a gain matrix by a deviation vector including, as components, a deviation between the equilibrium state value and the estimated state value and an integrated value of a deviation between the target property value and the estimated property value, calculate an instruction opening degree by correcting the equilibrium opening degree using the correction opening degree, the instruction opening degree being used to control the state parameter from the estimated state value toward the equilibrium state value while causing a value of the property parameter to follow the target property value, and output a control signal indicating the instruction opening degree to the at least one valve.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferable embodiments together with the accompanying drawings in which.

DETAILED DESCRIPTION

A valve control device according to an embodiment will now be described with reference to FIGS. 1 to 3. The valve control device controls the opening degree of a valve that is provided in the intake passage of an engine, the exhaust passage of the engine, or a passage connected to one of the intake passage and the exhaust passage and can vary the cross-sectional flow area of the passage. First, the entire structure of the engine system will be described with reference to FIG. 1.

Figure 1:
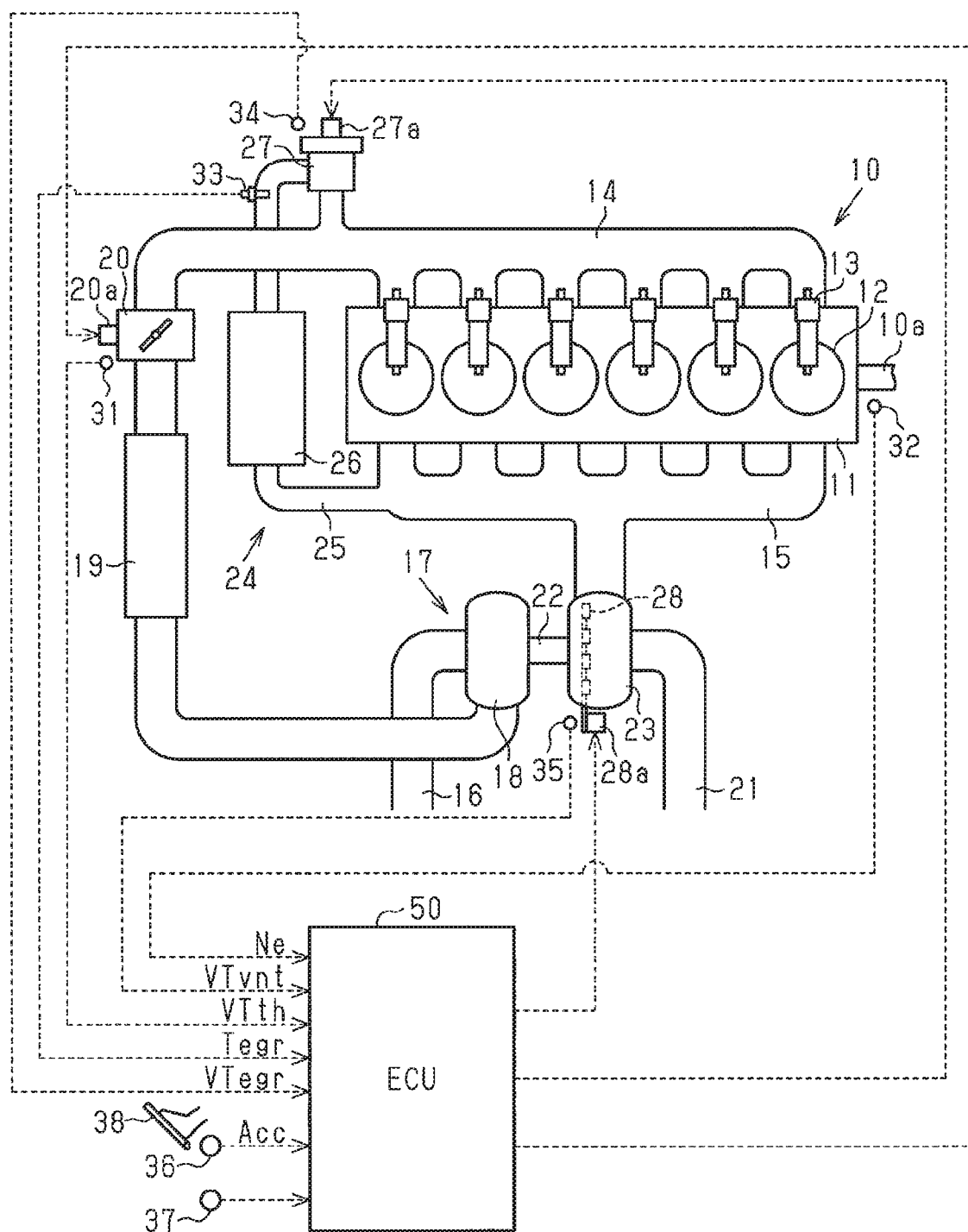
FIG. 1 is a schematic diagram of an engine system including a valve control device according to an embodiment.

As shown in FIG. 1, the engine system includes a diesel engine 10 (hereinafter simply referred to as engine 10), in which diesel fuel is used as fuel. The engine 10 includes a cylinder block 11 provided with cylinders 12. In each cylinder 12, fuel is injected from an injector 13 to working gas drawn into the engine 10, and the mixture of the working gas and the fuel is burned. Burning of such a mixture in the cylinders 12 in a predetermined order drives a crankshaft 10a of the engine 10.

An intake manifold 14 configured to supply working gas to the cylinders 12 and an exhaust manifold 15 into which exhaust gas flows from the cylinders 12 are connected to the cylinder block 11.

An intake passage 16 connected to the intake manifold 14 includes an air cleaner (not shown), a compressor 18 of a turbocharger 17, and an intercooler 19 sequentially from the upstream side. The intake passage 16 includes a diesel throttle valve 20 (hereinafter simply referred to as throttle valve 20) located downstream of the intercooler 19 and upstream of a part connected to an EGR passage 25 (described later). The throttle valve 20 is capable of varying the cross-sectional flow area of the intake passage 16. In the throttle valve 20, driving of a throttle actuator 20a varies a throttle opening degree VTth, thereby varying the effective opening area of the intake passage 16, through which intake air can flow. The throttle valve 20 is fully open when the throttle opening degree VTth is the minimum value, namely, zero.

An exhaust passage 21 is connected to the exhaust manifold 15. The exhaust passage 21 includes a turbine 23 connected to the compressor 18 by a connecting rod 22. Further, the EGR passage 25 of an EGR device 24 is connected to the exhaust manifold 15. The EGR passage 25 is connected to the intake passage 16. Some exhaust gas is drawn into the intake passage 16 as exhaust gas recirculation (EGR) gas. The EGR passage 25 includes an EGR cooler 26 that cools EGR gas, and an EGR valve 27 that is located downstream of the EGR cooler 26 and can vary the cross-sectional flow area of the EGR passage 25. When the EGR valve 27 is open, the working gas supplied to the cylinders 12 is a mixture of exhaust gas and intake air. When the EGR valve 27 is closed, the working gas supplied to the cylinders 12 is intake air. In the EGR valve 27, driving of an EGR actuator 27a varies an EGR opening degree VTegr, thereby varying the effective opening area of the EGR passage 25, through which EGR gas can flow into the EGR valve 27.

The turbocharger 17 is a variable displacement-type turbocharger (variable nozzle turbo: VNT) in which the turbine 23 is provided with variable nozzles 28. In each variable nozzle 28, driving of a VNT actuator 28a varies a VNT opening degree VTvnt, thereby varying the effective opening area of the variable nozzle 28, through which EGR gas can flow into the turbine 23.

The engine system includes a plurality of sensors. A throttle opening degree sensor 31 observes the throttle opening degree VTth, which is the opening degree of the throttle valve 20. An engine rotation speed sensor 32 observes an engine rotation speed Ne, which is the engine rotation speed of the crankshaft 10a. An EGR inlet temperature sensor 33 observes an EGR inlet temperature Tegr, which is the temperature of EGR gas flowing into the EGR valve 27. An EGR opening degree sensor 34 observes the EGR opening degree VTegr, which is the opening degree of the EGR valve 27. A VNT opening degree sensor 35 observes the VNT opening degree VTvnt, which is the opening degree of the variable nozzle 28. An accelerator operation amount sensor 36 observes an accelerator operation amount Acc, which is the application amount of an accelerator pedal 38 operated by the driver.

In addition, the engine system includes one or more sensors 37 that observe other parameters different from the above-described parameters. The sensors 37 include at least one of the following sensors: an air excess ratio sensor that is arranged downstream of the turbine 23 in the exhaust passage 21 and detects an air excess ratio λ in exhaust gas; an intake air amount sensor that is arranged upstream of the compressor 18 and observes an intake air amount Ga, which is the mass flow rate of intake air; a boost pressure sensor that observes a boost pressure Pb, which is the pressure of intake air turbocharged by the turbocharger 17, and is located at the downstream side of the throttle valve 20 and at the upstream side of a part where the intake passage 16 and the EGR passage 25 are connected to each other; and an intake temperature sensor that observes an intake temperature Tim, which is the temperature of the inside of the intake manifold 14 and the temperature of working gas drawn into the engine 10. Signals output by the sensors 31 to 37 are input to an electronic control unit (ECU) 50 including a control device that centrally controls the engine system.

The ECU 50, which is a control device, is configured mainly by a microcomputer in which a processor, memory, input interface, output interface, and the like are connected to one another by a bus. The processor includes a CPU and the like and executes necessary processes in accordance with computer programs (software). The memory such as a RAM or a ROM stores program codes or instructions configured to cause the CPU to execute processes. The memory, or computer readable medium, includes any type of available medium that is accessible by a versatile computer or dedicated computer. The control device may include a dedicated hardware circuit such as an application specific integrated circuit (ASIC) that executes at least some of various types of processes. That is, the control device may be configured by circuitry including 1) one or more processors running on computer programs (software), 2) a dedicated hardware circuit that executes at least some of various types of processes, or 3) a combination thereof.

The ECU 50 acts as a valve control device that controls the opening degree of the valve that is provided in the intake passage 16 of the engine 10, the exhaust passage 21 of the engine 10, or a passage connected to one of the intake passage 16 and the exhaust passage 21 and can vary the cross-sectional flow area of the passage. The ECU 50 acquires the observed values of the sensors 31 to 37 and controls the opening degrees of the valves such as the throttle valve 20, the EGR valve 27, and the variable nozzles 28 based on the acquired observed values.

Figure 2:
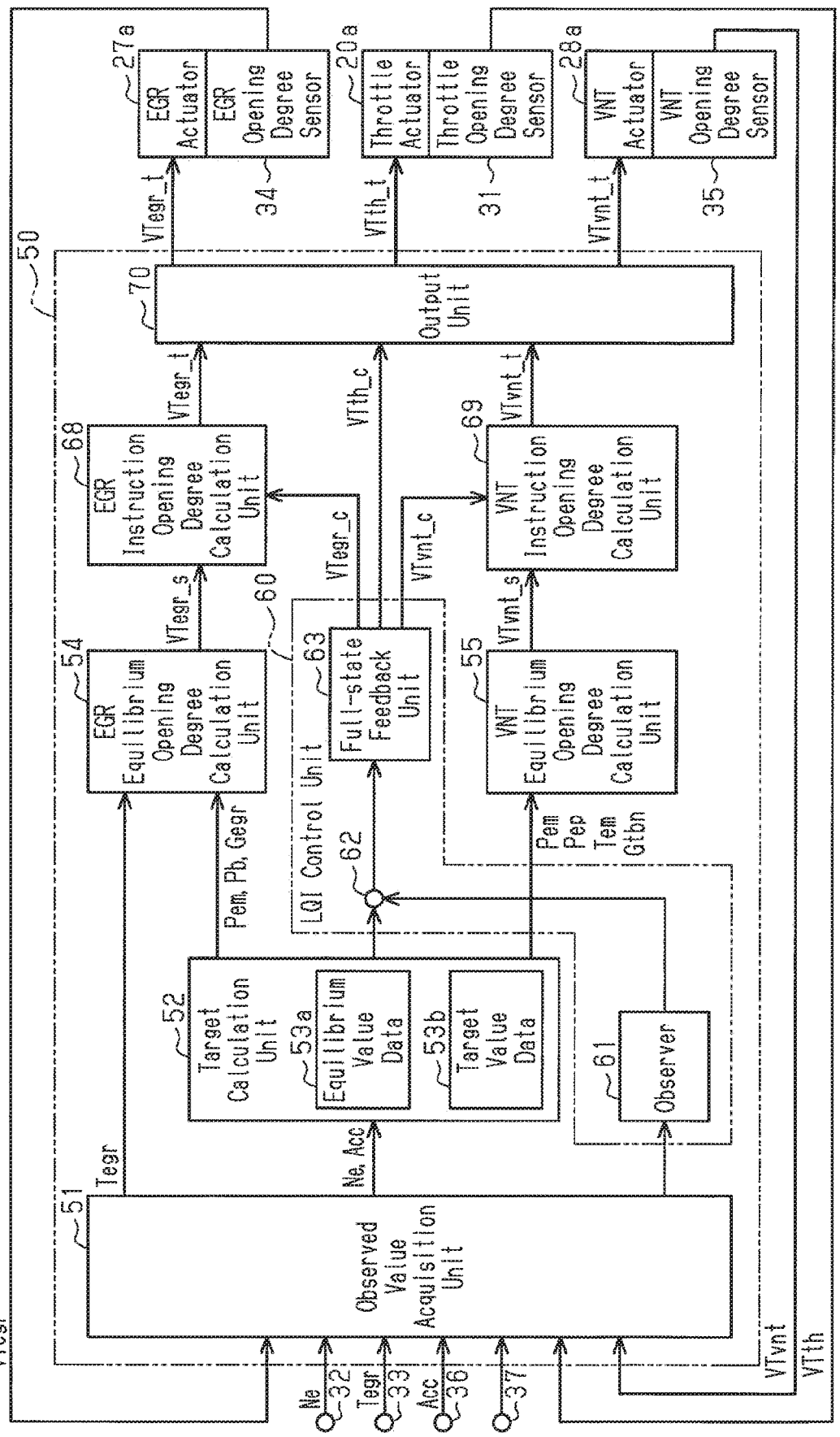
FIG. 2 is a functional block diagram showing an example of the valve control device.

As shown in FIG. 2, the ECU 50 includes various functional units. That is, the ECU 50 includes an observed value acquisition unit 51, a target calculation unit 52, an EGR equilibrium opening degree calculation unit 54, a VNT equilibrium opening degree calculation unit 55, a linear quadratic integral (LQI) control unit 60, an EGR instruction opening degree calculation unit 68, a VNT instruction opening degree calculation unit 69, and an output unit 70. The LQI control unit 60 includes an observer 61, a subtractor 62, and a full-state feedback unit 63 (hereinafter simply referred to as feedback unit 63) acting as a correction opening degree calculation unit.

The observed value acquisition unit 51 acquires observed values observed by the sensors 31 to 37. Based on signals from the sensors 31 to 37, the observed value acquisition unit 51 acquires the throttle opening degree VTth, the engine rotation speed Ne, the EGR inlet temperature Tegr, the EGR opening degree VTegr, the VNT opening degree VTvnt, and the accelerator operation amount Acc.

The target calculation unit 52 calculates equilibrium state values, which are equilibrium values of various types of state parameters related to states of the engine 10, based on the engine rotation speed Ne indicating the drive state of the engine 10 and the accelerator operation amount Acc indicating a demand of the driver for the output of the engine 10. For each state parameter, the target calculation unit 52 holds, for example, in a predetermined region of a memory, equilibrium value data 53a in which the equilibrium state value is specified for each engine rotation speed Ne and each accelerator operation amount Acc. The target calculation unit 52 reads a corresponding value from the equilibrium value data 53a to calculate the equilibrium state value of each state parameter. The equilibrium value data 53a is map data created based on the results of experiments and simulations that have been conducted in advance. Instead, for example, the target calculation unit 52 may calculate the equilibrium state value of each state parameter using a parameter indicating the drive state of the engine 10 such as the engine rotation speed Ne and a calculation expression including, as a variable, for example, the accelerator operation amount Acc indicating a demand of the driver for the output of the engine 10.

The equilibrium state value is a value of a state parameter when optimal combustion is realized in a steady state of the engine 10. The steady state of the engine 10 is determined in accordance with the engine rotation speed Ne and the accelerator operation amount Acc under a predetermined environmental condition such as ambient temperature and atmospheric temperature. In the steady state of the engine 10, the engine rotation speed Ne and the accelerator operation amount Acc are constant. In other words, when each state parameter is set to the equilibrium state value under the above-described predetermined environmental condition, the engine 10 is in the steady state in which optimal combustion is realized in accordance with the engine rotation speed Ne and the accelerator operation amount Acc. When the engine rotation speed Ne is low and the accelerator operation amount Acc is small, the equilibrium state value is set to, for example, a value at which combustion is realized with the properties of exhaust gas prioritized. In addition, when the accelerator operation amount Acc is large regardless of the engine rotation speed Ne, the equilibrium state value is set to, for example, a value at which combustion is realized with the output of the engine 10 prioritized.

The target calculation unit 52 calculates the equilibrium state value of each state parameter as described below.

Exhaust pressure Pem: the pressure of exhaust gas in the exhaust manifold 15

Boost pressure Pb: the pressure of intake air that has passed through the throttle valve 20 after being turbocharged by the turbocharger 17

EGR flow rate Gegr: the mass flow rate of EGR gas passing through the EGR valve 27

Turbine outlet pressure Pep: the pressure of exhaust gas in the outlet of the turbine 23

Turbine flow rate Gtbn: the mass flow rate of exhaust gas passing through the turbine 23

Exhaust temperature Tem: the temperature of exhaust gas in the exhaust manifold 15

Working gas amount Gwg: the mass flow rate of working gas drawn into the engine 10

EGR ratio $\eta$egr: the ratio of EGR gas in the working gas drawn into the engine 10

Further, the target calculation unit 52 calculates target property values, which are target values of various types of parameters related to the properties of working gas drawn into the engine 10, based on the engine rotation speed Ne and the accelerator operation amount Acc. For each property parameter, the target calculation unit 52 holds, for example, in a predetermined region of a memory, target value data 53b in which the target property value is specified for each engine rotation speed Ne and each accelerator operation amount Acc. The target calculation unit 52 reads a corresponding value from the target value data to calculate the target property value of each property parameter. The target value data 53b is map data created based on the results of experiments and simulations that have been conducted in advance. Instead, for example, the target calculation unit 52 may calculate the target property value of each property parameter using a calculation expression including, as variables, the engine rotation speed Ne, the accelerator operation amount Acc, and the like.

The target property value is a value of each property parameter that allows for the working gas amount and oxygen concentration with which optimal combustion is realized when the engine 10 is in a target state, which is set in accordance with the engine rotation speed Ne and the accelerator operation amount Acc. In other words, when each property parameter is set to the target property value, the engine 10 is in a state of drawing in working gas that allows for optimal combustion in the target state set in accordance with the engine rotation speed Ne and the accelerator operation amount Acc. The target state is, for example, set so that the output of the engine 10 is limited as compared to that of the actual state as the accelerator operation amount Acc is smaller relative to the engine rotation speed Ne. The target state is, for example, set so that the output of the engine 10 becomes larger as compared to that of the actual state as the accelerator operation amount Acc is larger relative to the engine rotation speed Ne.

The target calculation unit 52 calculates the target property value of each property parameter as described below.

Working gas amount Gwg: the mass flow rate of working gas drawn into the engine 10

EGR ratio $\eta$egr: the ratio of EGR gas in working gas drawn into the engine 10

Among the above-described parameters, the exhaust pressure Pem, the boost pressure Pb, and the EGR flow rate Gegr are state parameters related to the EGR valve 27, and the exhaust pressure Pem, the turbine outlet pressure Pep, the turbine flow rate Gtbn, and the exhaust temperature Tem are state parameters related to the variable nozzles 28. Further, among the parameters, the working gas amount Gwg and the EGR ratio $\eta$egr are state parameters related to working gas drawn into the engine 10 and property parameters indicating the properties of the working gas.

The target calculation unit 52 outputs, to the EGR equilibrium opening degree calculation unit 54, the exhaust pressure Pem, the boost pressure Pb, and the EGR flow rate Gegr. The target calculation unit 52 outputs, to the VNT equilibrium opening degree calculation unit 55, the exhaust pressure Pem, the turbine outlet pressure Pep, the turbine flow rate Gtbn, and the exhaust temperature Tem. The target calculation unit 52 outputs, to the subtractor 62 of the LQI control unit 60, the equilibrium state value of each state parameter and the target property value of each property parameter.

In addition to the above-described parameters, the state parameters may include a working gas density, which is the density of working gas in the intake manifold 14, and an exhaust gas density, which is the density of exhaust gas in the exhaust manifold 15. Further, the property parameter simply needs to be a parameter that may be used to obtain the working gas amount and oxygen concentration that allow for optimal combustion in the engine 10 in the target state set in accordance with the engine rotation speed Ne and the accelerator operation amount Acc. Thus, the property parameter is not limited to the working gas amount Gwg and the EGR ratio $\eta$egr and may be a plurality of parameters selected from parameters related to the properties of working gas such as the working gas amount Gwg, the EGR ratio $\eta$egr, the boost pressure Pb, and the intake air amount Ga.

The EGR equilibrium opening degree calculation unit 54 calculates an EGR equilibrium opening degree VTegr_s based on the EGR inlet temperature Tegr, which is acquired by the observed value acquisition unit 51, and the exhaust pressure Pem, the boost pressure Pb, and the EGR flow rate Gegr, which are calculated by the target calculation unit 52. The EGR equilibrium opening degree VTegr_s is the opening degree of the EGR valve 27 when the engine 10 is in the steady state determined in accordance with the engine rotation speed Ne and the accelerator operation amount Acc, which are acquired by the observed value acquisition unit 51. In other words, the EGR equilibrium opening degree VTegr_s is the opening degree of the EGR valve 27 in which the state parameter related to the EGR valve 27 is the equilibrium state value so that the engine 10 is controlled to the steady state determined in accordance with the engine rotation speed Ne and the accelerator operation amount Acc.

The exhaust pressure Pem corresponds to the upstream pressure of the EGR valve 27, the boost pressure Pb corresponds to the downstream pressure of the EGR valve 27, the EGR inlet temperature Tegr corresponds to the inlet temperature of the EGR valve 27, and the EGR flow rate Gegr corresponds to the flow rate of EGR gas passing through the EGR valve 27. With regard to the EGR valve 27, the observed value acquisition unit 51 acts as an inlet temperature acquisition unit.

To calculate the EGR equilibrium opening degree VTegr_s, the EGR equilibrium opening degree calculation unit 54 calculates an EGR inlet pressure Pegr, which is the pressure of EGR gas flowing into the EGR valve 27. For example, the EGR equilibrium opening degree calculation unit 54 includes a model capable of calculating the EGR inlet pressure Pegr based on the EGR flow rate Gegr, the exhaust pressure Pem, and the like. The EGR equilibrium opening degree calculation unit 54 calculates a pressure loss value ΔPegr from the exhaust manifold 15 to the inlet of the EGR valve 27 based on the EGR flow rate Gegr and subtracts the calculated pressure loss value ΔPegr from the exhaust pressure Pem to calculate the EGR inlet pressure Pegr. Then, the EGR equilibrium opening degree calculation unit 54 substitutes the EGR inlet pressure Pegr, the boost pressure Pb, the EGR inlet temperature Tegr, and the EGR flow rate Gegr into the following expression (1) based on Bernoulli's principle to calculate the EGR opening degree area Aegr.

$$G = A\sqrt{\frac{2\kappa P_1^2}{(\kappa-1)RT_1}\left\{\left(\frac{P_2}{P_1}\right)^{\frac{2}{\kappa}} - \left(\frac{P_2}{P_1}\right)^{\frac{(\kappa+1)}{\kappa}}\right\}} \quad (1)$$

G: EGR flow rate Gegr
$P_1$: EGR inlet pressure Pegr
$P_2$: Boost pressure Pb
$T_1$: EGR inlet temperature Tegr
A: EGR opening degree area Aegr
κ: Heat capacity ratio of exhaust gas
R: Gas constant Subsequently, the EGR equilibrium opening degree calculation unit 54 calculates the EGR equilibrium opening degree VTegr_s, which is the opening degree of the EGR valve 27 corresponding to the EGR opening degree area Aegr. The EGR equilibrium opening degree calculation unit 54 calculates, for example, the EGR equilibrium opening degree VTegr_s at which the effective opening area is the EGR opening degree area Aegr. The effective opening area is an opening area obtained from a design specification value or the result of experiments and simulations that have been conducted in advance. The effective opening area is, for example, the opening area of a valve, kept at a predetermined opening degree, calculated backward from the pressure ratio and the inlet temperature of the valve that occur when the valve is supplied with exhaust gas having a predetermined flow rate. The EGR equilibrium opening degree calculation unit 54 holds, in a predetermined region of a memory, EGR opening degree data in which the opening degree of the EGR valve 27 is specified for each effective opening area. The EGR equilibrium opening degree calculation unit 54 reads the opening degree corresponding to the EGR opening degree area Aegr from the EGR opening degree data to calculate the EGR equilibrium opening degree VTegr_s.

The VNT equilibrium opening degree calculation unit 55 calculates a VNT equilibrium opening degree VTvnt_s of the variable nozzle 28 based on the exhaust pressure Pem, the turbine outlet pressure Pep, the turbine flow rate Gtbn, and the exhaust temperature Tem, which are calculated by the target calculation unit 52. The VNT equilibrium opening degree VTvnt_s is the opening degree of the variable nozzle 28 when the engine 10 is in the steady state determined in accordance with the engine rotation speed Ne and the accelerator operation amount Acc, which are acquired by the observed value acquisition unit 51. In other words, the VNT equilibrium opening degree VTvnt_s is the opening degree of the variable nozzle 28 when the state parameters related to the variable nozzle 28 are the equilibrium state values so that the engine 10 is controlled to be in the steady state determined in accordance with the engine rotation speed Ne and the accelerator operation amount Acc. The VNT equilibrium opening degree calculation unit 55 substitutes the parameters calculated by the target calculation unit 52 into the above-described expression (1) to calculate the VNT open area Avnt.

G: Turbine flow rate Gtbn
$P_1$: Exhaust pressure Pem
$P_2$: Turbine outlet pressure Pep
$T_1$: Exhaust temperature Tem
A: VNT opening degree area Avnt
κ: Heat capacity ratio of exhaust gas
R: Gas constant The exhaust pressure Pem corresponds to the upstream pressure of the variable nozzle 28, the turbine outlet pressure Pep corresponds to the downstream pressure of the variable nozzle 28, the exhaust temperature Tem corresponds to the inlet temperature of the variable nozzle 28, and the turbine flow rate Gtbn corresponds to the flow rate at the variable nozzle 28. With regard to the variable nozzle 28, the target calculation unit 52 acts as an inlet temperature acquisition unit.

Subsequently, the VNT equilibrium opening degree calculation unit 55 calculates the VNT equilibrium opening degree VTvnt_s, which is the opening degree of the variable nozzle 28 corresponding to the VNT opening degree area Avnt. The VNT equilibrium opening degree calculation unit 55 calculates, for example, the VNT equilibrium opening degree VTvnt_s in which the effective opening area is the VNT opening degree area Avnt. The VNT equilibrium opening degree calculation unit 55 holds, in a predetermined region of a memory, VNT opening degree data in which the opening degree of the variable nozzle 28 is specified for each effective opening area. The VNT equilibrium opening degree calculation unit 55 reads the opening degree corresponding to the VNT opening degree area Avnt from the VNT opening degree data to calculate the VNT equilibrium opening degree VTvnt_s.

The LQI control unit 60 performs LQI control to calculate the EGR correction opening degree VTegr_c used to correct the EGR equilibrium opening degree VTegr_s, the VNT correction opening degree VTvnt_c used to correct the VNT equilibrium opening degree VTvnt_s, and the throttle correction opening degree VTth_c used to correct the throttle equilibrium opening degree VTth_s.

The throttle equilibrium opening degree VTth_s in the engine 10 is set to zero, indicating the fully-open state in which the intake resistance in the throttle valve 20 is the minimum. Thus, the throttle correction opening degree VTth_c calculated by the LQI control unit 60 is identical with the throttle instruction opening degree VTth_t. Accordingly, FIG. 2 illustrates that the throttle correction opening degree VTth_c, which is the calculation result of the LQI control unit 60 related to the throttle valve 20, is output as the throttle instruction opening degree VTth_t.

The LQI control executed by the LQI control unit 60 is an integral-mode optimal servo control and is applied to a system represented by state equation (2) and output (observation) equation (3), which will be described below. In state equation (2), x(t) is a state amount vector including a value of the state parameter as its component, and u(t) is a control input vector including a control input value (instruction opening degree) for each valve as its component. In output equation (3), y(t) is an output vector including a value of the property parameter as its component. Further, in state equation (2), A is a system matrix, B is an input matrix, and d(t) is a step disturbance. In output equation (3), C is an observation matrix.

$$\dot{x}(t)=Ax(t)+Bu(t)+d(t) \quad (2)$$

$$y(t)=Cx(t) \quad (3)$$

The LQI control executed by the LQI control unit 60 will now be described. First, a state amount vector x(t) in an equilibrium state is defined as an equilibrium state amount vector xs (xs≠0), an output vector y(t) in the equilibrium state is defined as a target output vector r (r≠0), and a control input vector u(t) in the equilibrium state is defined as an equilibrium control input vector us (us≠0). In addition, a deviation from the equilibrium state amount vector xs of the state amount vector x(t) of the current system is defined as a state amount deviation vector δx(t) (δx(t)=x(t)−xs).

The components of the equilibrium state amount vector xs include the equilibrium state value of each state parameter calculated by the target calculation unit 52, and the components of the state amount vector x(t) include the estimated state value of each state parameter calculated by the observer 61. Further, the components of the target output vector r include a target property value of each property parameter calculated by the target calculation unit 52, and the components of the output vector y(t) include an estimated property value of each property parameter calculated by the observer 61. In addition, the components of the equilibrium control input vector us include equilibrium opening degrees VTegr_s and VTvnt_s calculated by the equilibrium opening degree calculation units 54, 55 and the equilibrium opening degree VTth_s, which is a fixed value, and the components of the control input vector u(t) include instruction opening degrees VTegr_t, VTvnt_t, and VTth_t for each type of the valves.

The above-described LQI control requests, in the form of state feedback, a correction control input vector δu(t) for the equilibrium control input vector us (us=u(t)−us). More specifically, in t→∞, the LQI control is performed for the purpose of obtaining an optimal control input vector u(t) that minimizes a predetermined quadratic form evaluation function to control the state amount vector x(t) of the current system to the equilibrium state amount vector xs (δx(t)→0) while causing the output vector y(t) obtained based on the state amount vector x(t) of the current system to follow the target output vector r (y(t)→r).

In the LQI control executed by the LQI control unit 60, the following expression (4) is used to calculate the correction control input vector δu(t). In expression (4), the gain matrix multiplied from the left by the state amount deviation vector δx(t) is a first gain matrix $K_1$. In expression (4), the gain matrix multiplied from the left by an output deviation vector ∫δy(t) that includes, as its component, an integrated value of the deviation between the output vector y(t) and the target output vector r is a second gain matrix $K_2$. In expression (4), the initial value of the state amount deviation vector δx(t) is zero. In addition, the step disturbance d(t) in state equation (2) is deleted in a process of obtaining expression (4).

$$\delta u(t)=-K_1 \delta x(t)-K_2 \int_0^t \{r-y(t)\}dt \quad (4)$$

The LQI control unit 60 that performs the above-described LQI control includes various functional units. That is, the LQI control unit 60 includes an observer 61, a subtractor 62, and a feedback unit 63.

The observer 61 includes a model that has, as a variable, an observed value acquired by the observed value acquisition unit 51 and estimates the value of each parameter in the current engine system. The observer 61 substitutes the observed value acquired by the observed value acquisition unit 51 into the model to calculate the estimated value of each parameter. The estimated value of each calculated parameter includes an estimated value of the state parameter and an estimated value of the property parameter. The observer 61 outputs the estimated value of the state parameter to the subtractor 62 as the estimated state value and outputs the estimated value of the property parameter to the subtractor 62 as the estimated property value. In addition to the above-described observed value, a control input value related to control of the engine 10 such as a fuel injection amount calculated by a fuel injection controller (not shown) may be input to the observer 61 in order to calculate the estimated value of each parameter.

For each state parameter, the subtractor 62 calculates a state amount deviation, which is the deviation between the equilibrium state value calculated by the target calculation unit 52 and the estimated state value calculated by the observer 61 and outputs the calculated state amount deviation to the feedback unit 63.

Further, for each property parameter, the subtractor 62 calculates a property deviation, which is the deviation between the target property value calculated by the target calculation unit 52 and the estimated property value calculated by the observer 61 and outputs the calculated property deviation to the feedback unit 63.

Figure 3:
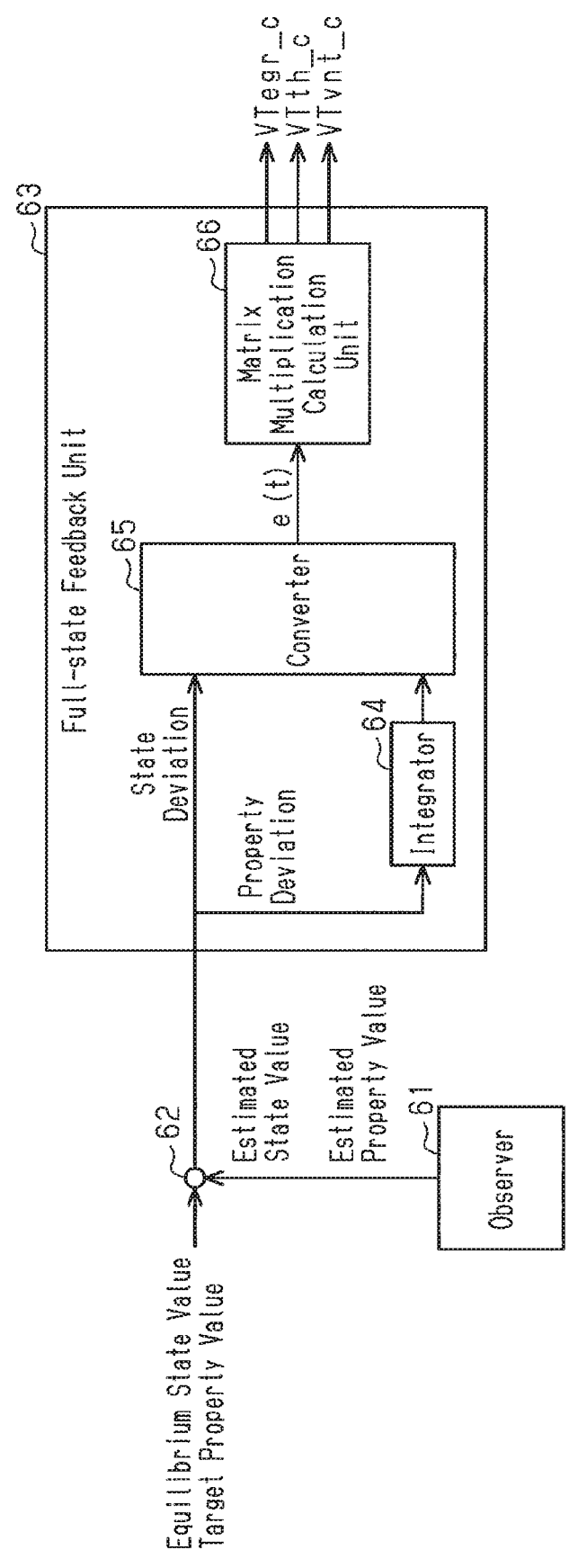
FIG. 3 is a functional block diagram showing an example of a full-state feedback unit.

As shown in FIG. 3, the feedback unit 63 includes various functional units. That is, the feedback unit 63 includes an integrator 64, a converter 65, and a matrix multiplication calculation unit 66.

The feedback unit 63 inputs the state amount deviation output by the subtractor 62 to the converter 65 as a component of the state amount deviation vector δx(t) in the above-described expression (4). Further, the feedback unit 63 uses the integrator 64 to integrate the property deviation output by the subtractor 62 and inputs the integrated value to the converter 65 as a component of the output deviation vector ∫δy(t) in the above-described expression (4).

The state amount deviation and the integrated value of the property deviation are input to the converter 65. The converter 65 converts these input values into deviation vectors e(t) (e(t)=[δx(t)∫δy(t)]$^T$: T represents transposed matrix) including these input values as components and outputs the converted deviation vector e(t) to the matrix multiplication calculation unit 66.

The matrix multiplication calculation unit 66 multiplies, from the left, a gain matrix K (K=[−$K_1$−$K_2$]) including the first gain matrix $K_1$ and the second gain matrix $K_2$ by the deviation vector e(t) input from the converter 65. Thus, the EGR correction opening degree VTegr_c, the VNT correction opening degree VTvnt_c, and the throttle correction opening degree VTth_c are calculated. Then, the feedback unit 63 outputs the EGR correction opening degree VTegr_c to the EGR instruction opening degree calculation unit 68, outputs the VNT correction opening degree VTvnt_c to the VNT instruction opening degree calculation unit 69, and outputs the throttle correction opening degree VTth_c to the output unit 70.

Referring to FIG. 2, the EGR instruction opening degree calculation unit 68 calculates the EGR instruction opening degree VTegr_t, which is an instruction opening degree for the EGR valve 27. The EGR instruction opening degree calculation unit 68 adds the EGR correction opening degree VTegr_c calculated by the feedback unit 63 to the EGR equilibrium opening degree VTegr_s calculated by the EGR equilibrium opening degree calculation unit 54 to calculate the EGR instruction opening degree VTegr_t.

The VNT instruction opening degree calculation unit 69 calculates the VNT instruction opening degree VTvnt_t, which is an instruction opening degree for the variable nozzle 28. The VNT instruction opening degree calculation unit 69 adds the VNT correction opening degree VTvnt_c calculated by the feedback unit 63 to the VNT equilibrium opening degree VTvnt_s calculated by the VNT equilibrium opening degree calculation unit 55 to calculate the VNT instruction opening degree VTvnt_t.

The output unit 70 outputs, to the EGR actuator 27a, a control signal indicating the EGR instruction opening degree VTegr_t calculated by the EGR instruction opening degree calculation unit 68. Further, the output unit 70 outputs, to the VNT actuator 28a, a control signal indicating the VNT instruction opening degree VTvnt_t calculated by the VNT instruction opening degree calculation unit 69. Thus, the opening degree of the EGR valve 27 is controlled to the EGR instruction opening degree VTegr_t, and the opening degree of the variable nozzle 28 is controlled to the VNT instruction opening degree VTvnt_t. Further, the output unit 70 outputs a control signal indicating the throttle correction opening degree VTth_c calculated by the feedback unit 63 to the throttle actuator 20a as the throttle instruction opening degree VTth_t. Thus, the opening degree of the throttle valve 20 is controlled to the throttle instruction opening degree VTth_t.

The valve control device of the above-described embodiment has the following advantages.

(1) The ECU 50, which is a valve control device, calculates the equilibrium state value of each state parameter in the equilibrium state in which optimal combustion is realized in the steady state determined in accordance with the engine rotation speed Ne indicating the drive state of the engine 10 and the accelerator operation amount Acc indicating a request of the driver for the output of the engine 10. Further, the ECU 50 calculates the target property value of each property parameter in which optimal combustion is realized in the target state determined in accordance with the engine rotation speed Ne and the accelerator operation amount Acc. In addition, the ECU 50 calculates the equilibrium opening degree of each valve based on the equilibrium state value of each state parameter. The equilibrium opening degree is the opening degree of a valve when the engine 10 is controlled to the steady state determined in accordance with the engine rotation speed Ne and the accelerator operation amount Acc under a predetermined environmental condition.

The state of the engine 10 changes as time elapses. Thus, the state of the engine 10 is not frequently in the steady state determined in accordance with the engine rotation speed Ne and the accelerator operation amount Acc at a given moment. In other words, the value of the state parameter frequently deviates from the value of the equilibrium state value.

In addition to calculating the equilibrium opening degree, the ECU 50 calculates the correction opening degree for the equilibrium opening degree through the LQI control in order to calculate an optimal instruction opening degree. The correction opening degree is used to cause the estimated property value of each property parameter to follow the target property value while controlling the estimated state value of each state parameter to the equilibrium state value. Then, the ECU 50 outputs to each valve the instruction opening degree, at which the equilibrium opening degree is corrected with the correction opening degree. That is, the instruction opening degree output to each valve is set to an optimal opening degree in order to control the state parameter to the equilibrium state value while causing the property parameter to follow the target property value. Thus, in the engine 10, while the steady state determined in accordance with the engine rotation speed Ne and the accelerator operation amount Acc is maintained, the properties of working gas are controlled so as to shift to the target state determined in accordance with the engine rotation speed Ne and the accelerator operation amount Acc. Thus, regardless of the steady state or a transient state, the ECU 50 can highly precisely control the valve provided in the intake passage 16 of the engine 10, the exhaust passage 21, or a passage connected to one of the intake passage 16 and the exhaust passage 21 to the opening degree corresponding to the state of the engine 10 at a given moment. As a result, the properties of working gas can be highly precisely controlled to desired properties.

(2) Additionally, for example, the equilibrium opening degree of each valve can be calculated based on map data corresponding to an environmental condition. However, in such a configuration, data of each environmental condition, more specifically, data of each ambient temperature and atmospheric pressure needs to be prepared for the corresponding valve, which requires a vast amount of data.

In this regard, the above-described configuration dispenses with the above-described vast amount of data by calculating the equilibrium opening degree of each valve based on the engine rotation speed Ne and the accelerator operation amount Acc. In addition, the property parameter relates to the properties of working gas including air that is taken from outside air. That is, the property deviation, which is the deviation between property parameters, reflects the current environmental condition. With the above-described configuration, the correction opening degree is calculated for the property parameter to follow the target property value. Thus, the correction opening degree that reflects the environmental condition at a given moment can be calculated.

(3) The state parameter includes the property parameter, which is a parameter related to the properties of working gas. That is, the working gas amount Gwg and the EGR ratio ηegr, which are the property parameters, are the components of the state amount deviation vector δx(t) and the output deviation vector ∫δy(t). Using the correction opening degree reduces the steady-state error related to the target property value. Additionally, since the state amount deviation vector δx(t) includes the property parameter, the response of the opening degree relative to changes in the property parameter improves.

(4) The ECU 50 controls the opening degree of each of the EGR valve 27, the variable nozzle 28, and the throttle valve 20 through the LQI control. For these opening degrees, the ECU 50 calculates the correction opening degree under the same condition at the same time and outputs the instruction opening degree to each valve. Consequently, the opening degrees of these valves can be controlled effectively and cooperatively.

(5) The observed value acquisition unit 51 is configured to observe an observed value of the EGR inlet temperature sensor 33 corresponding to the EGR valve 27. That is, the observed value acquisition unit 51 acts as an inlet temperature acquisition unit. This simplifies the configuration of the inlet temperature acquisition unit and reduces calculation load on the ECU 50.

It should be apparent to those skilled in the art that the present invention may be embodied in many other specific forms without departing from the spirit or scope of the invention. Particularly, it should be understood that the present invention may be embodied in the following forms.

The valves controlled by the ECU 50 simply need to be provided in the intake passage 16 of the engine 10, the exhaust passage 21, or a passage connected to one of the intake passage 16 and the exhaust passage 21. Thus, the valves are not limited to the EGR valve 27, the variable nozzles 28, and the throttle valve 20 and may be, for example, a wastegate that is provided in the turbocharger and adjusts the amount of exhaust gas flowing into the turbine by diverting the flow of the exhaust gas flowing into the turbine. Alternatively, the valve may be a low-pressure EGR valve of a low-pressure EGR device, which causes exhaust gas passing through an exhaust purification device to flow back to the upstream side of the compressor 18 in the intake passage 16. Specifically, the valve may be a low-pressure EGR valve that is provided in the exhaust passage 21 of the engine 10 and adjusts the amount of low-pressure EGR gas caused to flow back.

The ECU 50 simply needs to control one or more valves provided in an intake-exhaust passage of the engine 10 through the above-described LQI control. Thus, for example, the ECU 50 may control the EGR valve 27 through the LQI control and control the variable nozzles 28 and the throttle valve 20 using other control methods.

The property parameter does not have to be included in the state parameter. Even such a configuration allows for calculation of the correction opening degree used to control the state parameter to the equilibrium state value while causing the property parameter to follow the target value.

Figure 4:
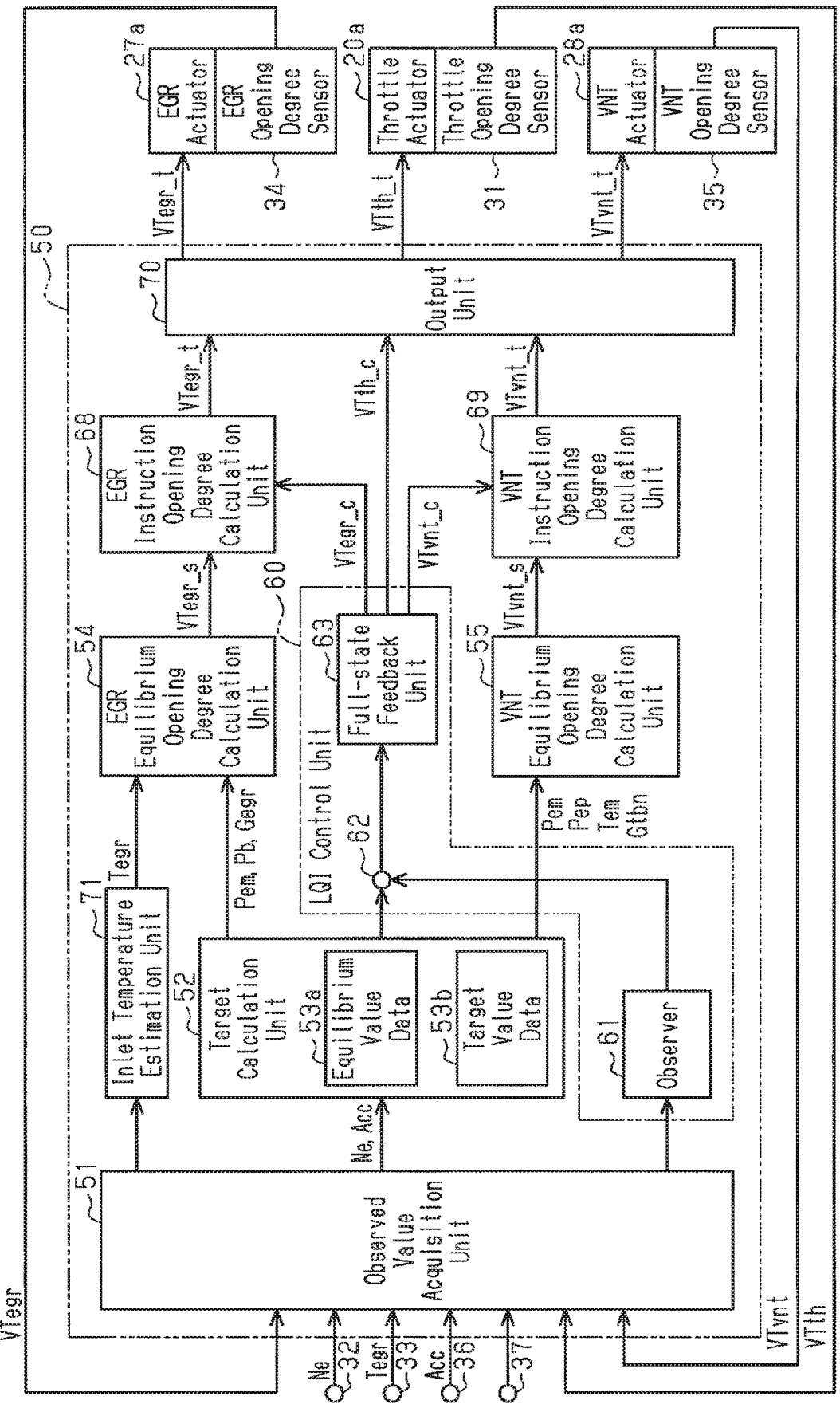
FIG. 4 is a functional block diagram showing another example of the valve control device.

Referring to FIG. 4, the inlet temperature acquisition unit may be an inlet temperature estimation unit 71 that estimates an inlet temperature through calculation using a model that includes, as a variable, an acquired value of the observed value acquisition unit 51 and differs from the model of the observer 61. Such a configuration reduces the influence of response delay that tends to occur in a temperature sensor. Thus, the precision of the equilibrium opening degree can be increased in a valve in which the equilibrium opening degree is obtained through a calculation expression including an inlet temperature as a variable.

The engine 10 of the engine system is not limited to a diesel engine and may be a gasoline engine or a gas engine.

Therefore, the present examples and embodiments are to be considered as illustrative and not restrictive and the invention is not to be limited to the details given herein, but may be modified within the scope and equivalence of the appended claims.

What is claimed is:

1. A valve control device that controls an opening degree of at least one valve provided in at least one of an intake passage of an engine, an exhaust passage of the engine, and a passage connected to the intake passage or the exhaust passage, the valve control device comprising:
an observed value acquisition unit configured to acquire an observed value of an engine rotation speed, an observed value of an accelerator operation amount, and an observed value of the opening degree of the at least one valve;
an inlet temperature acquisition unit configured to acquire an inlet temperature, the inlet temperature being a temperature of gas flowing into the at least one valve;
a target calculation unit configured to
calculate an equilibrium state value that is a value of a state parameter when the engine is in a steady state based on the observed value of the engine rotation speed and the observed value of the accelerator operation amount, wherein the state parameter includes an upstream pressure and a downstream pressure of the at least one valve and a flow rate at the at least one valve, and
calculate a target property value that is a value of a property parameter when the engine is in a target state corresponding to the observed value of the engine rotation speed and the observed value of the accelerator operation amount, wherein the property parameter is related to properties of working gas drawn into the engine;
an equilibrium opening degree calculation unit configured to calculate an equilibrium opening degree that is an opening degree of the at least one valve in the steady state of the engine using a calculation expression that includes, as variables, an equilibrium state value of the upstream pressure, an equilibrium state value of the downstream pressure, an equilibrium state value of the flow rate, and an acquired value of the inlet temperature;
an observer configured to calculate an estimated state value of the state parameter and an estimated property value of the property parameter using a model that includes, as a variable, an observed value of the opening degree of the at least one valve;
a correction opening degree calculation unit configured to calculate a correction opening degree used to correct the equilibrium opening degree by multiplying a gain matrix by a deviation vector including, as components, a deviation between the equilibrium state value and the estimated state value and an integrated value of a deviation between the target property value and the estimated property value;
an instruction opening degree calculation unit configured to calculate an instruction opening degree by correcting the equilibrium opening degree using the correction opening degree, wherein the instruction opening degree is used to control the state parameter from the estimated state value toward the equilibrium state value while causing a value of the property parameter to follow the target property value; and
an output unit configured to output a control signal indicating the instruction opening degree to the at least one valve.

2. The valve control device according to claim 1, wherein the property parameter is included in the state parameter.

3. The valve control device according to claim 1, wherein:
the at least one valve is one of a plurality of valves provided at different positions; and
the valve control device is configured to control the opening degree of each of the valves.

4. The valve control device according to claim 3, wherein the valves comprise:
an EGR valve configured to vary a cross-sectional flow area of an EGR passage that connects the exhaust passage to the intake passage and allows some of exhaust gas to flow back to the intake passage;
a variable nozzle provided in the exhaust passage, wherein the variable nozzle is configured to vary a cross-sectional flow area of a passage through which exhaust gas flows into a turbocharger; and a throttle valve provided in the intake passage, wherein the throttle valve is configured to vary a cross-sectional flow area of a passage through which intake air flows.

5. A valve control method that controls an opening degree of at least one valve provided in at least one of an intake passage of an engine, an exhaust passage of the engine, and a passage connected to the intake passage or the exhaust passage, the valve control method comprising:

acquiring an observed value of an engine rotation speed, an observed value of an accelerator operation amount, and an observed value of the opening degree of the at least one valve;

acquiring an inlet temperature, the inlet temperature being a temperature of gas flowing into the at least one valve;

calculating an equilibrium state value that is a value of a state parameter when the engine is in a steady state based on the observed value of the engine rotation speed and the observed value of the accelerator operation amount, wherein the state parameter includes an upstream pressure and a downstream pressure of the at least one valve and a flow rate at the at least one valve;

calculating a target property value that is a value of a property parameter when the engine is in a target state corresponding to the observed value of the engine rotation speed and the observed value of the accelerator operation amount, wherein the property parameter is related to properties of working gas drawn into the engine;

calculating an equilibrium opening degree that is an opening degree of the at least one valve in the steady state of the engine using a calculation expression that includes, as variables, an equilibrium state value of the upstream pressure, an equilibrium state value of the downstream pressure, an equilibrium state value of the flow rate, and an acquired value of the inlet temperature;

calculating an estimated state value of the state parameter and an estimated property value of the property parameter using a model that includes, as a variable, an observed value of the opening degree of the at least one valve;

calculating a correction opening degree used to correct the equilibrium opening degree by multiplying a gain matrix by a deviation vector including, as components, a deviation between the equilibrium state value and the estimated state value and an integrated value of a deviation between the target property value and the estimated property value;

calculating an instruction opening degree by correcting the equilibrium opening degree using the correction opening degree, wherein the instruction opening degree is used to control the state parameter from the estimated state value toward the equilibrium state value while causing a value of the property parameter to follow the target property value; and outputting a control signal indicating the instruction opening degree to the at least one valve.

6. A valve control device that controls an opening degree of at least one valve provided in at least one of an intake passage of an engine, an exhaust passage of the engine, and a passage connected to the intake passage or the exhaust passage, the valve control device comprising circuitry configured to:

acquire an observed value of an engine rotation speed, an observed value of an accelerator operation amount, and an observed value of the opening degree of the at least one valve;

acquire an inlet temperature, the inlet temperature being a temperature of gas flowing into the at least one valve;

calculate an equilibrium state value that is a value of a state parameter when the engine is in a steady state based on the observed value of the engine rotation speed and the observed value of the accelerator operation amount, wherein the state parameter includes an upstream pressure and a downstream pressure of the at least one valve and a flow rate at the at least one valve;

calculate a target property value that is a value of a property parameter when the engine is in a target state corresponding to the observed value of the engine rotation speed and the observed value of the accelerator operation amount, wherein the property parameter is related to properties of working gas drawn into the engine;

calculate an equilibrium opening degree that is an opening degree of the at least one valve in the steady state of the engine using a calculation expression that includes, as variables, an equilibrium state value of the upstream pressure, an equilibrium state value of the downstream pressure, an equilibrium state value of the flow rate, and an acquired value of the inlet temperature;

calculate an estimated state value of the state parameter and an estimated property value of the property parameter using a model that includes, as a variable, an observed value of the opening degree of the at least one valve;

calculate a correction opening degree used to correct the equilibrium opening degree by multiplying a gain matrix by a deviation vector including, as components, a deviation between the equilibrium state value and the estimated state value and an integrated value of a deviation between the target property value and the estimated property value;

calculate an instruction opening degree by correcting the equilibrium opening degree using the correction opening degree, wherein the instruction opening degree is used to control the state parameter from the estimated state value toward the equilibrium state value while causing a value of the property parameter to follow the target property value; and output a control signal indicating the instruction opening degree to the at least one valve.

* * * * *